(12) United States Patent
Dresser et al.

(10) Patent No.: US 10,014,884 B1
(45) Date of Patent: Jul. 3, 2018

(54) ANALOG MODULATED REPEATER/TRANSCEIVER

(71) Applicant: BAE SYSTEMS Information and Electronic Systems Integration Inc., Nashua, NH (US)

(72) Inventors: Timothy M. Dresser, Wilton, NH (US); Michael D. Blazej, Mont Vernon, NH (US); Gregory M. Flewelling, Freeport, ME (US); Brian J. Smith, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/694,228

(22) Filed: Sep. 1, 2017

(51) Int. Cl.
  *H04B 1/04* (2006.01)
  *H04B 1/00* (2006.01)
  *H04B 7/15* (2006.01)
  *H04B 1/40* (2015.01)

(52) U.S. Cl.
  CPC ............. *H04B 1/0014* (2013.01); *H04B 1/40* (2013.01); *H04B 7/15* (2013.01)

(58) Field of Classification Search
  CPC .......... H04B 1/04; H04B 1/40; H04B 1/0014; H04B 1/406

USPC ....... 455/7, 11.1, 15, 20, 23, 25, 454, 422.1, 455/403, 73, 42, 43, 55, 517, 426.1, 455/426.2; 1/1; 375/261, 219, 298
  See application file for complete search history.

(56) References Cited

U.S. PATENT DOCUMENTS

2007/0285308 A1* 12/2007 Bauregger ............. G01S 19/10
  342/357.27

* cited by examiner

*Primary Examiner* — Keith Ferguson
(74) *Attorney, Agent, or Firm* — Davis & Bujold, PLLC (57) ABSTRACT

An analog transceiver having low latency for processing a received RF/MW signal and modifying the received RF/MW signal into a modified RF/MW signal prior to transmission of the modified RF/MW signal. The analog transceiver comprises a receiving antenna; a direct conversion receiver, coupled with the receiving antenna, for splitting the received RF/MW signal into an in-phase portion and a quadrature portion; an analog signal processing device, having a plurality of actuatable switches, for modifying the in-phase and quadrature portions and outputting modified signals while only introducing minimal latency during processing; a direct conversion transmitter, for receiving the suitably modified in-phase and quadrature portions and forming the modified RF/MW signal; and a transmitting antenna for receiving the modified RF/MW signal and transmitting the modified RF/MW signal.

17 Claims, 5 Drawing Sheets

FIG. 1

IQMUX

FIG. 1A

| CTRL STATE | I' | Q' |
|---|---|---|
| 0 | I | Q |
| 1 | I | $\overline{Q}$ |
| 2 | $\overline{I}$ | Q |
| 3 | $\overline{I}$ | $\overline{Q}$ |
| 4 | Q | I |
| 5 | Q | $\overline{I}$ |
| 6 | $\overline{Q}$ | I |
| 7 | $\overline{Q}$ | $\overline{I}$ |

FIG. 1B

| CTRL STATE | SW1 | SW2 | SW3 | SW4 |
|---|---|---|---|---|
| 0 | THRU | THRU | OPEN | OPEN |
| 1 | THRU | INVERT | OPEN | OPEN |
| 2 | INVERT | THRU | OPEN | OPEN |
| 3 | INVERT | INVERT | OPEN | OPEN |
| 4 | OPEN | OPEN | THRU | THRU |
| 5 | OPEN | OPEN | THRU | INVERT |
| 6 | OPEN | OPEN | INVERT | THRU |
| 7 | OPEN | OPEN | INVERT | INVERT |

ANALOG MODULATED REPEATER/TRANSCEIVER

FIELD

The present disclosure relates to a mixed signal system that has a relatively low latency, while processing a received analog signal via an analog signal path, prior to retransmission of a modified analog signal.

BACKGROUND

It is known that conventional mixed signal systems are used for a variety of different applications. It is also known that the conventional mixed signal systems inherently have latency which is contained within the mixed signal system. For example, it is known that conventional wiring/circuitry has a latency of approximately 1 nano second/foot of wiring/circuitry. It is also known that conventional electronic components also have a latency and the latency of such components depends upon the type and the design of the conventional electronic components. In addition, it is also known that the wider the bandwidth is of the received RF/MW (radio frequency/micro wave) signal, the lower latency for manipulating that received RF/MW signal, while the narrower the bandwidth is of the received RF/MW signal the higher latency for manipulating that received RF/MW signal.

It is to be appreciated that for some applications higher latency for the mixed signal system is not critical or detrimental to the application. However, for a number of other applications higher latencies for the mixed signal system can have a detrimental affect and, accordingly, the associated latency of the mixed signal system is to be minimized is much as possible.

SUMMARY

Wherefore, it is an object of the present invention to overcome the above-mentioned shortcomings and drawbacks associated with conventional mixed signal system and thereby provide a mixed signal system which is designed to have the shortest possible latency while processing a received analog signal.

Another object is to provide a mixed signal system with flexibility of a digital transceiver with a low latency analog baseband path that can bypass the delay associated with converting the signal from an analog signal into a digital signal and then reconverting the signal back from the digital signal into an analog signal.

Another object is to provide a mixed signal system which is capable of receiving a RF/MW (radio frequency/microwave) signal, e.g., typically having a frequency of between 20 MHZ and 100 GHz, and processing/modifying the received RF/MW signal, e.g., massaging or modifying the received RF/MW signal depending upon the particular application, and then outputting the suitably modified RF/MW signal from an antenna of the mixed signal system for reception by a desired destination(s), end user(s) or other recipient(s).

A further object is to reduce, as much as possible, the latency of the mixed signal system so that the received signal is rapidly massaged, modified or otherwise altered and then retransmitted, by the mixed signal system, as rapidly as possible to a desired destination(s), end user(s) or other recipient(s).

Yet another object is to provide the mixed signal system with the DSP algorithm which permits the desired massaging, modification or alteration of the received RF/MW signal, by a digital control unit, prior to the modified RF/MW signal being automatically retransmitted by an antenna of the mixed signal system.

A still further object is to design the mixed signal system so as to permit manipulation or scaling of the amplitude of the received RF/MW signal prior to retransmitting of the transmitter RF/MW signal.

Another object is to provide a controllable unit which is relatively small and easily transportable.

Yet another object is to provide a full analog bandwidth repeater to re-transmit a signal without having to suffer with the latency of digital signal processing, ADCs, digital modulators, and DACs and provide a digital subsystem which can be used to align the analog modulator to the received signal.

A further object is to provide a full analog bandwidth system which permits alteration or restoration of signal phase states without any disruption of the signal flow through the mixed signal system.

The present disclosure relates to a mixed signal system that contains relatively low latency analog signal paths, and possibly a digital signal processing, and a digital controller. The analog signal processing is configured/synchronized to match the desired function by the controller. The key benefit of such mixed signal system is that it provides the flexibility of a digital transceiver with a low latency analog baseband path that can bypass the delay typically associated with converting from an analog signal into a digital signal and then converting back from a digital signal into an analog signal.

The present disclosure also relates to a analog transceiver having low latency for processing a received RF/MW signal and modifying the received RF/MW signal into a modified RF/MW signal prior to transmission of the modified RF/MW signal, the analog transceiver comprising: a receiving antenna for receiving the RF/MW signal; a direct conversion receiver, coupled with the receiving antenna, for splitting the received RF/MW signal into an in-phase portion and a quadrature portion; an analog signal processing device, coupled with the direct conversion receiver, having a plurality of actuatable switches for modifying, as desired, the in-phase portion and the quadrature portion and outputting a suitably modified in-phase portion and a suitably modified quadrature portion from the analog signal processing device while only introducing minimal latency during processing; a direct conversion transmitter, coupled with the analog signal processing device, for receiving the suitably modified in-phase portion and the suitably modified quadrature portion and forming the modified RF/MW signal therefrom; and a transmitting antenna being coupled with direct conversion transmitter for receiving the modified RF/MW signal and transmitting the modified RF/MW signal.

The present disclosure also relates to a method or minimizing latency in an analog transceiver processing a received RF/MW signal and modifying the received RF/MW signal into a modified RF/MW signal prior to transmission of the modified RF/MW signal, the method transceiver comprising: receiving the RF/MW signal via a receiving antenna; splitting the received RF/MW signal into an in-phase portion and a quadrature portion via a direct conversion receiver which is coupled with the receiving antenna; modifying, as desired, the in-phase portion and the quadrature portion and outputting a suitably modified in-phase portion and a suitably modified quadrature portion from the analog signal processing device while only introducing minimal latency during processing an analog signal processing device, coupled with the direct conversion receiver, via actuation of a plurality of actuatable switches; receiving the suitably modified in-phase portion and the suitably modified quadrature portion, via a direct conversion transmitter which is coupled with the analog signal processing device, and forming the modified RF/MW signal therefrom; and receiving the modified RF/MW signal, via a transmitting antenna coupled with direct conversion transmitter, and transmitting the modified RF/MW signal.

BRIEF DESCRIPTION OF THE DRAWINGS

The accompanying drawings, which are incorporated in and constitute a part of the specification, illustrate various embodiments and together with the general description of the invention given above and the detailed description of the drawings given below, serve to explain the principles of the system. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present systems and techniques will be understood by reference to the following detailed description, which should be read in conjunction with the appended drawings. It is to be appreciated that the following detailed description of various embodiments is by way of example only and is not meant to limit, in any way, the scope of the present disclosure.

Figure 1:
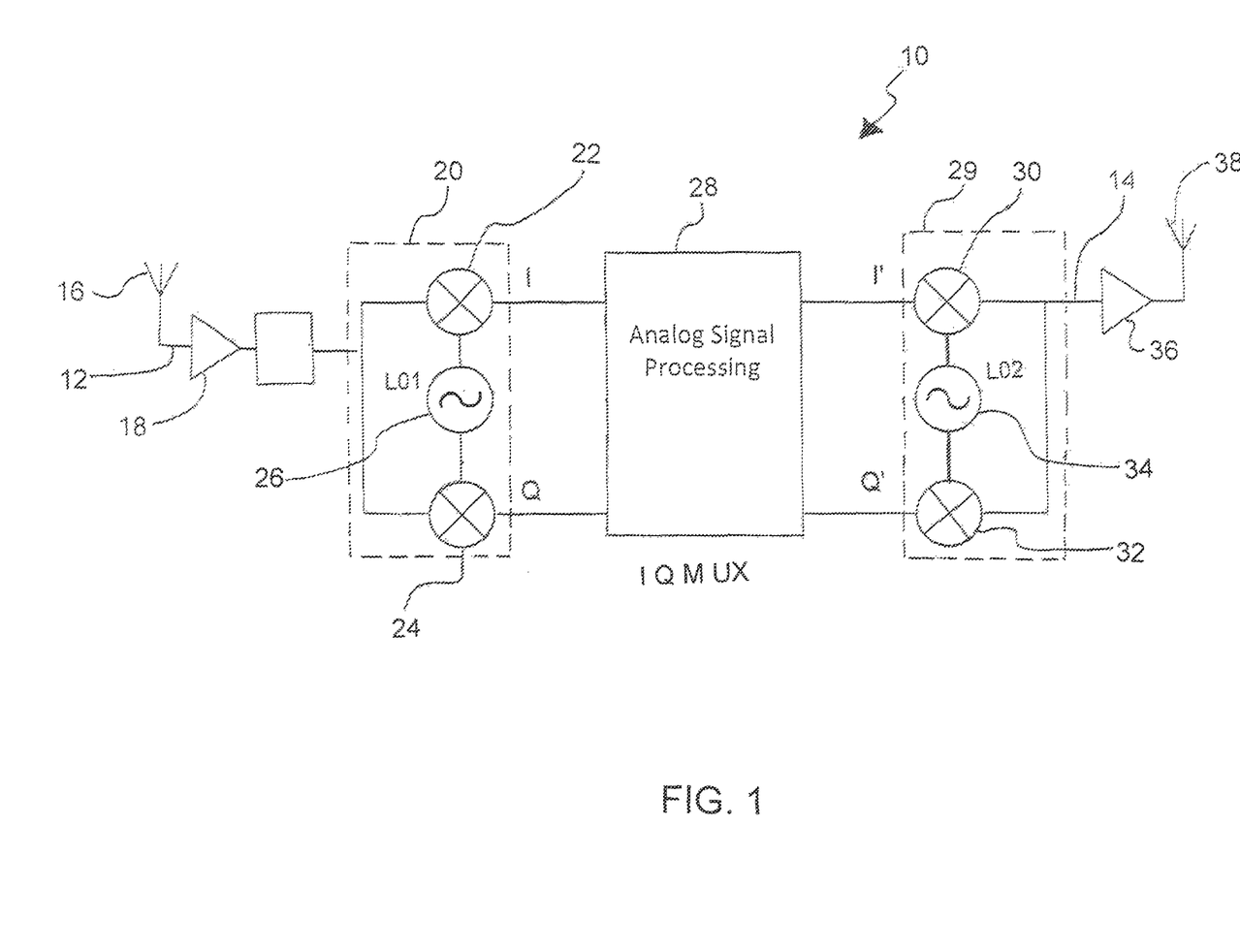
FIG. 1 is a diagrammatic representation showing the design of an analog transceiver according to one embodiment of the disclosure.

Turning now to FIG. 1, a brief description concerning the various components of one embodiment of the disclosure will now be briefly discussed. As can be seen, this embodiment relates to an analog transceiver 10 for processing a received RF/MW signal 12, manipulating, modifying, or otherwise altering the received RF/MW signal, as desired or necessary, and, thereafter, transmitting the modified RF/MW signal 14 to the desired destination(s), recipient(s) or end user(s). As used herein, RF/MW refers to the broad range of radio frequency (RF) signals and/or microwave (MW) signals. As generally shown, the analog transceiver 10 comprises a receiving antenna 16 which receives the RF/MW signal and a low noise amplifier 18, which is electrically coupled with the receiving antenna 16, for receiving and then amplifying the received RF/MW signal 12. An optional filter unit 19 can be used to remove extraneous noise(s) or interfering signal(s). The filter unit can be a low-pass filter, band-pass filter or high-pass filter depending upon the particular application. While depicted as a single receiving antenna 16, it is to be appreciated that there can be a multitude of antenna elements that make up the antenna.

A direct conversion receiver 20 (shown in dashed lines) is connected to and receives the amplified signal from the low noise amplifier 18 electrically coupled with the receiving antenna 16. As shown, the direct conversion receiver 20 splits, in a conventional downconversion manner, the received RF/MW signal 12 into first and second separate portions with the first or in-phase ("I") portion being an output of a first (downconversion) mixer 22 while a second or quadrature ("Q") portion of the received RF/MW signal 12 being an output of a second (downconversion) mixer 24. As shown in FIG. 1, an input local oscillator (LO1) or frequency reference 26 is electrically coupled to both of the first (downconversion) mixer 22 and the second (downconversion) mixer 24 to allow modification or downconversion of the received RF/MW signal 12 into intermediate frequency I and Q portions.

Thereafter, both the I portion and the Q portion of the received RF/MW signal 12 are each a differential signal, e.g., as diagrammatically shown in FIG. 1A, which is then inputted into an IQ multiplexer or mux 28 where the I portion and/or the Q portion of the received RF/MW signal 12 can be modified, as necessary or required, depending upon the particular application, before both of those modified signals, I' and Q', are then subsequently outputted from the IQ mux 28 and recombined with one another, as discussed below, to form the modified RF/MW signal 14. A further detailed discussion concerning the purpose and function of the IQ mux 28 will be provided below with reference to FIGS. 1A-1D. As used herein, the IQ mux 28 is also referred to as the intermediate frequency analog procession section.

The first and second suitably modified output signals, I' and Q', outputted from the IQ mux 28, are then respectively sent to a direct conversion transmitter 29 (shown in dashed lines) which comprises a third (upconversion) mixer 30 and a fourth (upconversion) mixer 32 and well as a common connection node (not separately labeled) where the (modified) in-phase portion I' and the (modified) quadrature portion are combined with one another. As also shown in FIG. 1, an output local oscillator (LO2) or frequency reference 34 electrically couples or interconnects both of the third (upconversion) mixer 30 and the second output or (upconversion) mixer 32 to allow any desired modification of the frequency and/or the phase of the modified I' and Q' signal to the modified RF/MW signal 14, prior to the modified RF/MW signal 14 being transmitted, by the mixed signal system, to the desired destination(s), recipient(s) or end user(s). The outputs from each of the third (upconversion) mixer 30 and the second output or (upconversion) mixer 32 are then recombined with one another and this combined signal then passes through an output amplifier 36 prior to be sent to an output antenna 38 for transmission of the modified RF/MW signal 14. As previously noted, the antenna 38 can be a plurality of antenna elements. In some examples, there is a single antenna array and a switch that allows for both reception and transmission from the single antenna array.

It is to be appreciated that for some applications, the frequency and/or the phase of the received RF/MW signal 12 may be the same as the frequency and/or the phase of the modified RF/MW signal 14. However, for other applications, the frequency or phase of the received RF/MW signal 12 will be different from the frequency and/or the phase of the modified RF/MW signal 14. As is conventional in the art, the input and output local oscillators or frequency references 26, 34 each facilitate adjusting of at least one of the frequency and/or the phase of both the received RF/MW signal 12 and/or the modified RF/MW signal 14.

Turning now to FIGS. 1A-1D, a detailed description concerning the function of the IQ mux 28 will now be provided. As diagrammatically shown in FIG. 1A, the I portion of the signal is diagrammatically shown as a differential signal, i.e., shown as one of two separate inputs to the IQ mux 28, while the Q portion of the signal is also diagrammatically shown as a differential signal, i.e., shown as one of two separate inputs to the IQ mux 28, which are all supplied as inputs to the IQ mux 28. The IQ mux 28 comprises first 2, second 4, third 6 and fourth 8 switches which, depending upon the states of at least two switches, either allows the I portion and/or the Q portion to pass unaltered through the IQ mux 28, facilitates switching of the I portion and/or the Q portion of the signals with one another, facilitates inversion of the I portion and/or the Q portion of the signals, or facilitates both switching and inversion of the I portion and/or the Q portion of the signals.

For example, if both the first and second switches 2, 4 are in the thru (closed) state while the remaining switches in the open state (e.g., CTRL STATE 0), then both the I portion and the Q portion, of the received RF/MW signal 12, pass directly through the IQ mux 28 without any modification of either signal. However, if first switch 2 is in the thru (closed) state while the second switch 4 is in the invert state and the remaining switches are in the open state (e.g., CTRL STATE 1), then the I portion of the received RF/MW signal 12 passes directly through the IQ mux 28, without any modification of the I portion, but the Q portion, as it passes through the IQ mux 28 is modified by inverting the Q portion.

If the second switch 4 is in the thru (closed) state while the first switch 2 is in the invert state and the remaining switches are in the open state (e.g., CTRL STATE 2), then the Q portion of the received RF/MW signal 12 passes directly through the IQ mux 28, without any modification of the Q portion, but the I portion, as it passes through the IQ mux 28 is modified by inverting the I portion. If the first switch 2 is in the invert state and the second switch 4 is in the invert state while the remaining switches are in the open state (e.g., CTRL STATE 3), then the I portion, as it passes through the IQ mux 28, is modified by inverting the I portion and the Q portion, as it passes through the IQ mux 28, is modified by inverting the Q portion.

If both the third and the fourth switches 6, 8 are in the thru (closed) state while the remaining switches are in the open state (e.g., CTRL STATE 4), then the I portion is switched with the Q portion and the Q portion is switched with the I portion as both portions flow through the IQ mux 28. If the fourth switch 8 is in the invert state and the third switch 6 is in the thru (closed) state while the remaining switches are in the open state (e.g., CTRL STATE 5), then the I portion of the received RF/MW signal 12 is switched with the Q portion, as the I portion passes through the IQ mux 28 while the Q portion, as it passes through the IQ mux 28, is both switched and inverted as the Q portion passes through the IQ mux 28.

If the third switch 6 is in the invert state and the fourth switch 8 is in the thru (closed) state while the remaining switches are in the open state (e.g., CTRL STATE 6), then the Q portion of the received RF/MW signal 12 is switched with the I portion, as the Q portion passes through the IQ mux 28, while the I portion, as it passes through the IQ mux 28, is modified by both switching and inverting of the I portion. If the third switch 6 is in the invert state and the fourth switch 8 is in the inverted state while the remaining switches are in the open state (e.g., CTRL STATE 7), then the I portion, as it passes through the IQ mux 28, is both switched and inverted as the I portion passes through the IQ mux 28, while the Q portion, as it passes through the IQ mux 28, is also both switched and inverted as the Q portion passes through the IQ mux 28.

Figure 2:
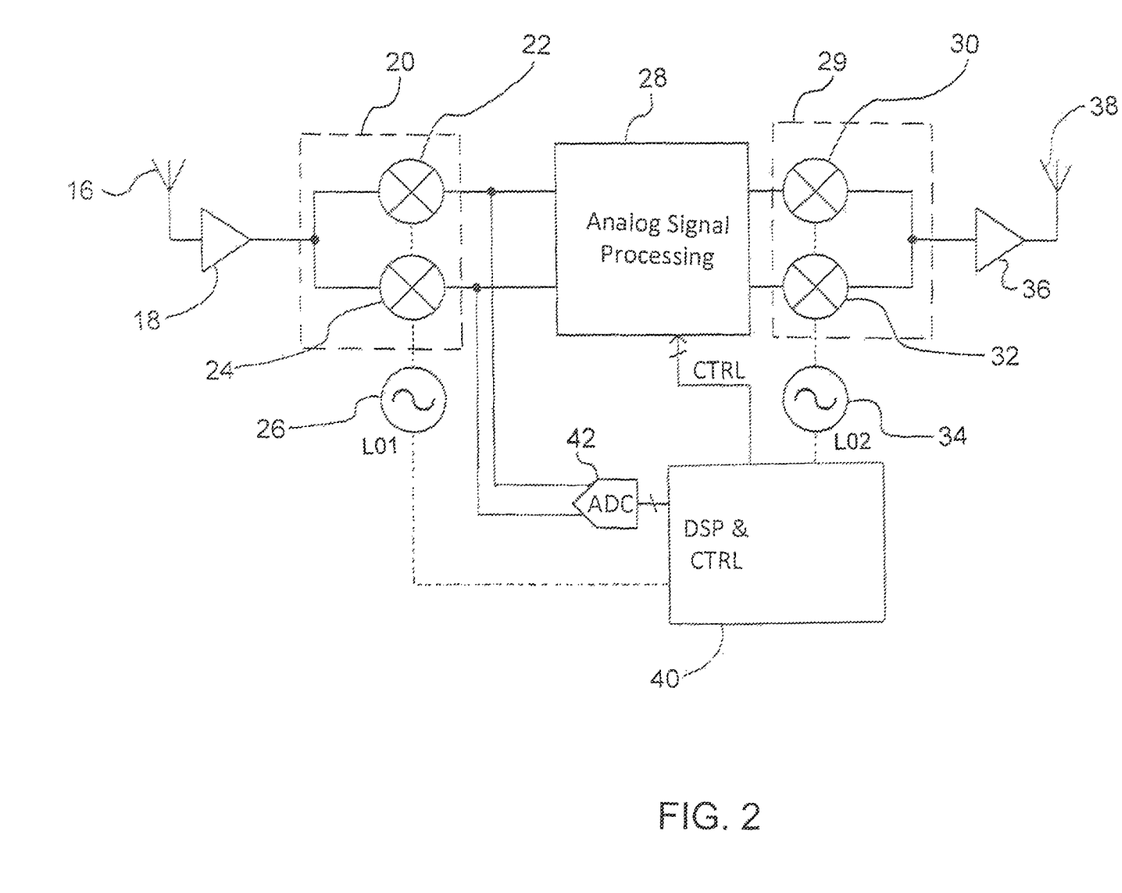
FIG. 2 is a diagrammatic representation showing the design of an analog transceiver with a digital controller according to one embodiment of the disclosure.

Turning now to FIG. 2, a second embodiment will now be described. As this embodiment is similar to the previously discussed embodiment, only the significant differences between this new embodiment and the previous embodiment will be discussed in detail while identical elements will be given identical reference numerals.

It is to be appreciated that certain analog mixed signals can misalign/shift/swap the in-phase or I portion and the quadrature or Q portion signals. The analog I/Q realignment mux 28 can be utilized to realign/shift/swap the signals back into a different and possibly more correct order.

As with the previous embodiment, the analog multiplexor comprises an analog transceiver 10 for processing a received RF/MW signal 12, manipulating, modifying, or otherwise altering the received RF/MW signal 12 and, thereafter, transmitting the modified RF/MW signal 14 to the desired destination(s), recipient(s) or end user(s). The analog transceiver 10 comprises a receiving antenna 16 for receiving the RF/MW signal which is electrically coupled to a low noise amplifier 18 for amplifying the received RF/MW signal 12.

A direct conversion receiver 20 (shown in dashed lines) is connected to and receives the amplified signal from the low noise amplifier 18 electrically coupled with the receiving antenna 16. As shown, the direct conversion receiver 20 splits the received RF/MW signal 12 into first and second separate portions, with the first or in-phase ("I") portion being an output of a first (downconversion) mixer 22 while a second or quadrature ("Q") portion of the received RF/MW signal 12 being an output of the second (downconversion) mixer 24. An input local oscillator (LO1) or frequency reference 26 electrically couples both of the first (downconversion) mixer 22 and the second (downconversion) mixer 24 with one another to allow modification of the frequency and/or phase shifting, for example, of the received RF/MW signal 12 once the signal is split into the I and the Q portions.

Figure 1A:
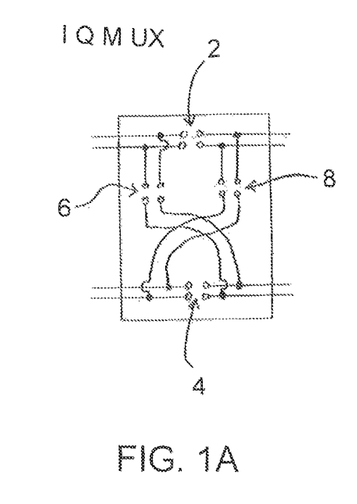
FIG. 1A is a diagrammatic representation showing the analog I/Q realignment mux according to one embodiment of the disclosure.
Figure 1B:
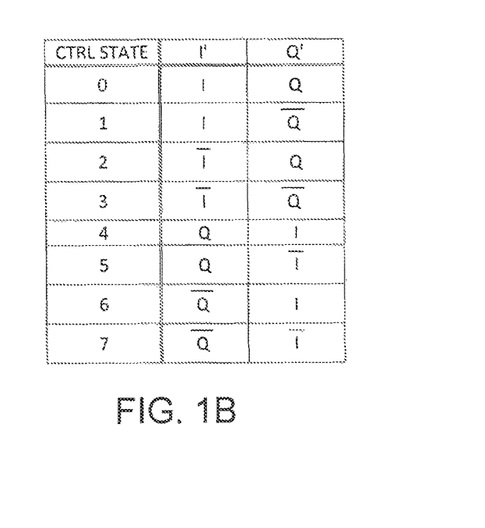
FIG. 1B is a control table showing the outputted I and Q from the analog I/Q realignment mux.
Figure 1C:
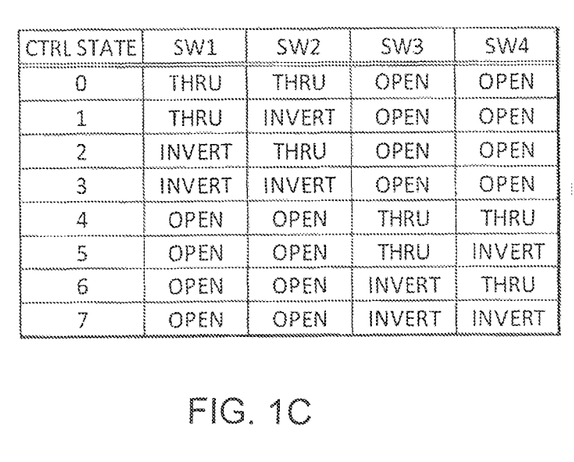
FIG. 1C is a table showing the state of the switches for the control states.
Figure 1D:
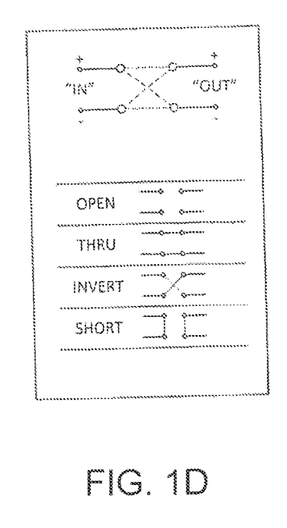
FIG. 1D is a diagrammatic drawing showing the available states for the switches.

Thereafter, both the I portion and the Q portion of the received RF/MW signal 12, which are each split into a differential signal, e.g., as diagrammatically shown in FIG. 1A, are then sent or inputted into an Analog Signal Processing device or IQ mux 28, where the I portion and/or the Q portion of the received RF/MW signal 12 can be modified, as necessary or required by the operator, depending upon the particular application, before both of those (modified) output signals are then outputted from the Analog Signal Processing device or IQ mux 28, as discussed above, for transmission to the desired destination(s), recipient(s) or end user(s).

As with the previous embodiment, the first and second suitably modified output signals, from the Analog Signal Processing device or the IQ mux 28, are then respectively sent to a direct conversion transmitter 29 (shown in dashed lines) which comprises a third (upconversion) mixer 30 and a fourth (upconversion) mixer 32 and well as a common connection node (not separately labeled) for combining the (modified) in-phase portion and the (modified) Q portion with one another. An output local oscillator (LO2) or frequency reference 34 electrically couples or interconnects both of the third (upconversion) mixer 30 and the fourth (upconversion) mixer 32 with one another to allow any desired modification of the frequency and/or the phase of the signal, for example, of the modified RF/MW signal 14. As noted above, the output sides of each of the third (upconversion) mixer 30 and the fourth (upconversion) mixer 32 are then recombined with one another. Thereafter, the combined signal then passes through an output amplifier 36 and is then sent to an output antenna 38 for transmission of the modified RF/MW signal 14 to the desired destination(s), recipient(s) or end user(s).

According to this embodiment, the mixed signal system is equipped with a digital controller, e.g., a DSP and Control unit 40 which can be either signal dependent or application dependent. The I portion and the Q portion, outputted from the first (downconversion) mixer 22 and the second (downconversion) mixer 24, are both sent to an ADC 42 (e.g., an analog digital converter) of the DSP and Control unit 40 where the analog signal is converted, in a conventional manner, into a digital signal to facilitate processing of that digital signal by the DSP and Control unit 40. The DSP and Control unit 40 facilitates manipulation of the digital signal, as desired or required by an operator, prior to a signal being outputted from the DSP and Control unit 40 and sent to the Analog Signal Processing device or IQ mux 28, to assist with processing of the analog signal passing through the Analog Signal Processing device or IQ mux 28.

As generally shown in FIG. 2, the DSP and Control unit 40 is also directly electrically coupled to both the input the output local oscillators or frequency references 26, 34 to facilitate controlling, by the operator of the DSP and Control unit 40, either the frequency and/or the phase of the received RF/MW signal 12 and/or the modified RF/MW signal 14, in a conventional manner. It is to be appreciated, however, that the DSP and Control unit 40 also introduces some latency into the system. The amount late latency introduced depends upon the particular components, wires and circuitry which comprise part of both the ADC 42 and the DSP and Control unit 40.

Figure 3:
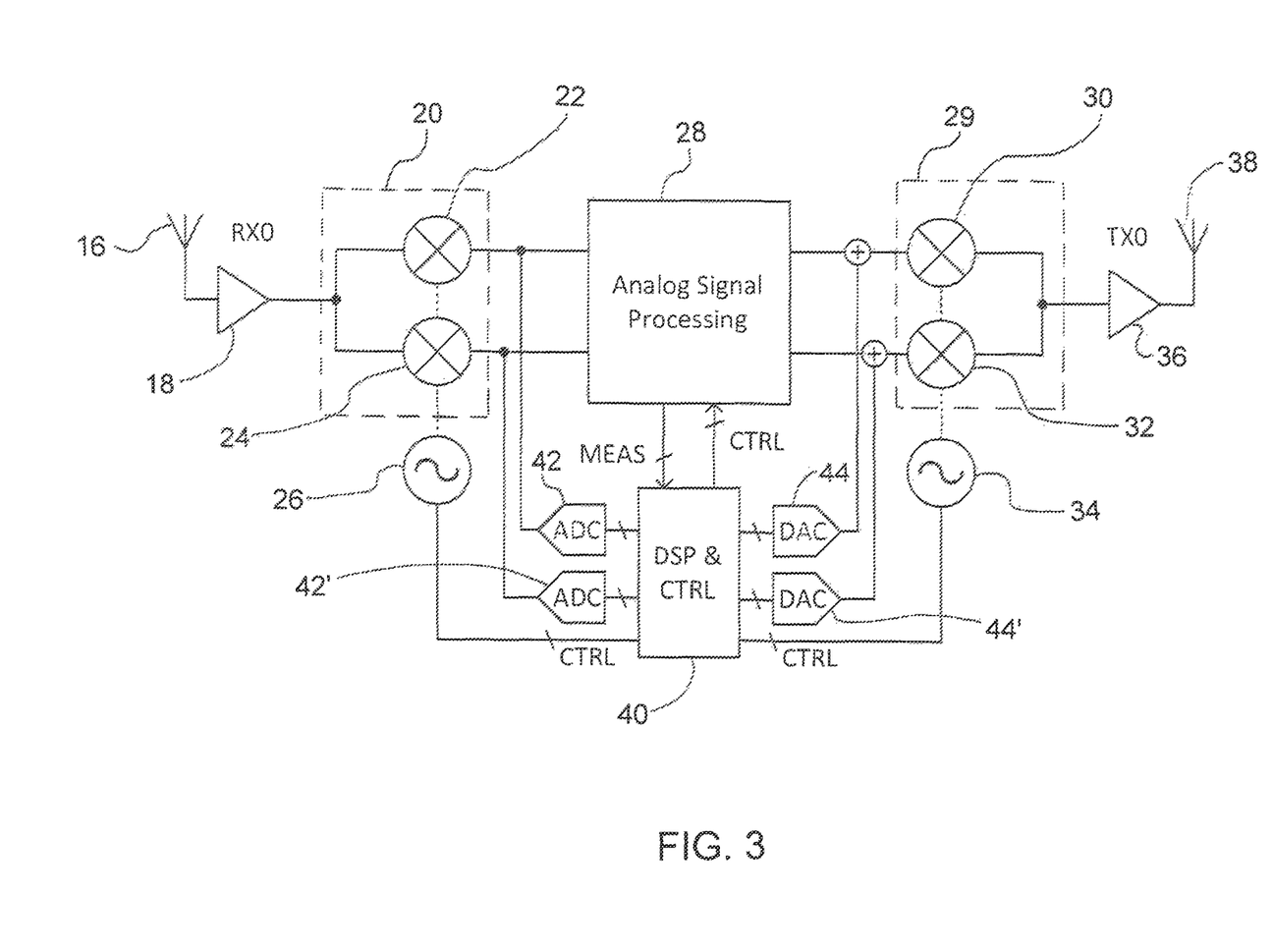
FIG. 3 is a diagrammatic representation showing the design of a single channel mixed signal system which has both a low latency analog signal path and a digital controller, according to one embodiment of the disclosure.

Turning now to FIG. 3, a third embodiment will now be described. As this embodiment is similar to both of the previously discussed embodiments, only the significant differences between this third embodiment and the previous embodiments will be discussed in detail while identical elements will be given identical reference numerals.

As with both of the previous embodiments, the analog multiplexor comprises an analog transceiver 10 for processing the received RF/MW signal 12, manipulating, modifying, or otherwise altering the received RF/MW signal 12 and, thereafter, transmitting the modified RF/MW signal 14 to the desired destination(s), recipient(s) or end user(s). The analog transceiver 10 comprises a receiving antenna 16 for receiving the RF/MW signal which is electrically coupled to a low noise amplifier 18 for receiving and amplifying the received RF/MW signal 12.

A direct conversion receiver 20 (shown in dashed lines) is connected to and receives the amplified signal from the low noise amplifier 18 electrically coupled with the receiving antenna 16. As shown, the direct conversion receiver 20 splits the received RF/MW signal 12 into first and second separate portions, with the first or in-phase ("I") portion being an output of a first (downconversion) mixer 22 while a second or quadrature ("Q") portion of the received RF/MW signal 12 being an output of the second (downconversion) mixer 24. An input local oscillator or frequency reference 26 electrically couples both of the first (downconversion) mixer 22 and the second (downconversion) mixer 24 with one another to allow modification of the frequency or phase shifting, for example, of the received RF/MW signal 12 once the signal is split into its I and Q portions.

Thereafter, both the I portion and the Q portion of the received RF/MW signal 12 are then sent or inputted as a differential signal, as diagrammatically shown in FIG. 1A, into an Analog Signal Processing device, e.g., an IQ mux 28, where the I portion and/or the Q portion of the received RF/MW signal 12 can then be modified, as necessary or required by the operator, depending upon the particular application, before both of those modified signals are then outputted from the Analog Signal Processing device or IQ mux 28, as discussed above, and recombination with one another for transmission to the desired destination(s), recipient(s) or end user(s).

As with the previous embodiments, the two suitably modified output signals, from the Analog Signal Processing device or IQ mux 28, are then respectively sent to a direct conversion transmitter 29 (shown in dashed lines) which comprises a third (upconversion) mixer 30 and a fourth (upconversion) mixer 32 and well as a common connection node (not separately labeled) for combining the (modified) I portion and the (modified) Q portion with one another prior to transmission. An output local oscillator or frequency reference 34 electrically couples or interconnects both of the third (upconversion) mixer 30 and the fourth (upconversion) mixer 32 with one another to allow any desired modification of the frequency and/or the phase of the signal, for example, the I portion and the Q portion of the modified RF/MW signal 14. As noted above, the output sides of each of the third (upconversion) mixer 30 and the fourth (upconversion) mixer 32 are then combined with one another at the common connection node (not separately labeled). Thereafter, the combined signal then passes through an output amplifier 36 and is then sent to an output antenna 38 for transmission of the modified RF/MW signal 14 to the desired destination(s), recipient(s) or end user(s).

According to this embodiment, the I portion, outputted from the first (downconversion) mixer 22, is also sent to an I portion first ADC 42 (e.g., an analog digital converter) where the I portion analog signal is converted, in a conventional manner, into a first digital signal for processing of that first digital signal by the DSP and Control unit 40 while the Q portion, outputted from the second (downconversion) mixer 24, is sent to a Q portion second ADC 42' (e.g., an analog digital converter) where the Q portion analog signal is converted, in a conventional manner, into a second digital signal to facilitate processing of that second digital signal by the DSP and Control unit 40 in a conventional manner. The DSP and Control unit 40 may include, for example, a desired algorithm, to facilitate the desired manipulation or modification of the first and/or the second digital signals, as required or instructed by an operator.

Also, as generally shown in FIG. 3, the DSP and Control unit 40 is also directly electrically coupled to both the input local oscillator or frequency reference 26 and the output local oscillator or frequency reference 34 to facilitate controlling, via the DSP and Control unit 40, either the frequency and/or the phase of the received RF/MW signal 12 and/or the modified RF/MW signal 14, in a conventional manner. In addition, the DSP and Control unit 40 can transmit a desire control signal to the Analog Signal Processing device or IQ mux 28 as well as receive MEAS from the Analog Signal Processing device or IQ mux 28. The MEAS is a measurement made within the Analog Signal Processing device. The measurement may be, for example, a calculation based upon one or more inputs to the Analog Signal Processing device. The MEAS may be an analog or digital signal. Digital interfers that there is a comparator built into the analog signal processing block.

As shown, a first output control signal, from the DSP and Control unit 40, can be sent to a first DAC 44, i.e., a digital to analog converter, for conversion of the first output control signal into a first analog signal, in a conventional manner, which is then combined with the first signal outputted from the Analog Signal Processing device or IQ mux 28 and inputted to the third (upconversion) mixer 30, while a second output control signal, from the DSP and Control unit 40, can be sent to a second DAC 44', i.e., a digital to analog converter, for conversion of the second output control signal into a second analog signal, in a conventional manner, which is then combined with the second signal outputted from the Analog Signal Processing device or IQ mux 28 and inputted to the fourth (upconversion) mixer 32.

It is to be appreciated, however, that the DSP and Control unit 40 also introduces additional latency into the system. The amount of latency introduced depends upon the particular components, wires and circuitry which comprise part of the ADCs 42, the DACs 44 and the DSP and Control unit 40.

Figure 4:
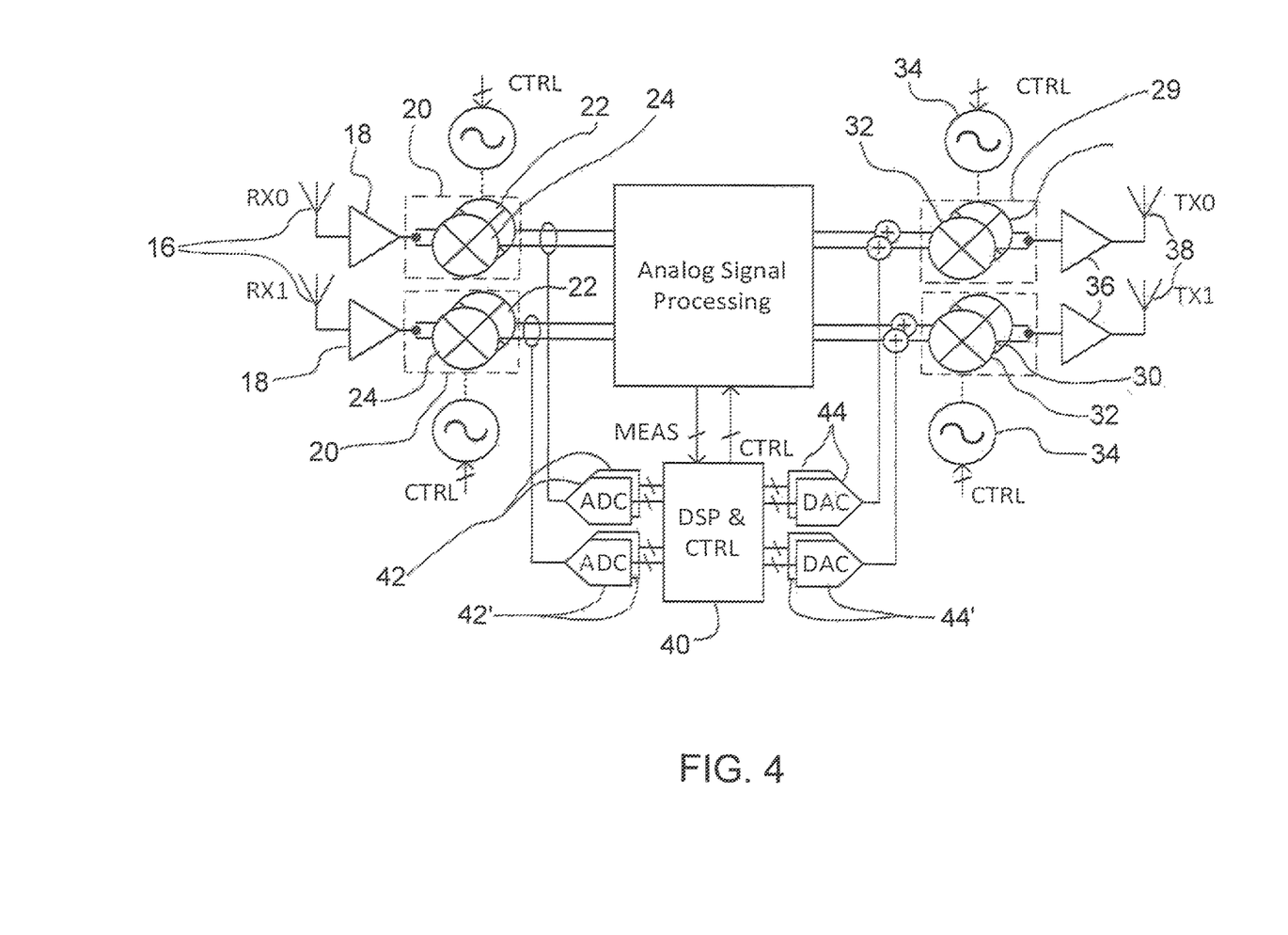
FIG. 4 is a diagrammatic representation showing the design of a multi-channel mixed signal system which has both a low latency analog signal path and a digital controller, according to one embodiment of the disclosure.

Turning now to FIG. 4, a fourth embodiment will now be described. As this embodiment is similar to the previously discussed third embodiment, only the differences between this fourth embodiment and the third embodiments will be discussed in detail while identical elements will be given identical reference numerals.

As with the third embodiment, the analog multiplexor comprises an analog transceiver 10 for processing a received RF/MW signal 12, manipulating, modifying, or otherwise altering the received RF/MW signal 12 and, thereafter, transmitting the modified RF/MW signal 14 to the desired recipient or end user. According to this embodiment, the analog transceiver 10 is capable of processing a plurality of separate and distinct received RF/MW signals 12, manipulating, modifying, or otherwise altering the received RF/MW signals 12 and, thereafter, transmitting each of the modified RF/MW signals 14 to the desired destination(s), recipient(s) or end user(s). That is, in the embodiment shown in FIG. 4, the analog transceiver 10 is capable of simultaneously processing two separate and distinct received RF/MW signals 12 and then retransmitting each one of the modified RF/MW signals 14 to the desired destination(s), recipient(s) or end user(s). While the following description relates to processing two different received RF/MW signals 12, it is to be appreciated that processing of three or more separate and distinct received RF/MW signals 12 and subsequent retransmitting each one of the modified RF/MW signals 14 can be readily achieved by increase the number of antennas, amplifiers, ADCs, DACs, etc., while still utilizing only a single Analog Signal Processing device or IQ mux 28 and a single DSP and Control unit 40.

It is to be appreciated that any TX channel, for example TX0, could be the combination of two or more channels, e.g., TX0 and RX1. The resulting combination may be either a sum of the two or more channels, a difference of the two or more channels or other analog function of the two or more I/Q signals or channels.

The analog transceiver 10, according to this embodiment, comprises two receiving antennas 16 for each receiving a respective RF/MW signal. Each receiving antennas 16 is electrically coupled to a respective low noise amplifier 18 for receiving and amplifying the respectively received RF/MW signal 12.

A respective direct conversion receiver 20 (shown in dashed lines) is connected to and receives an amplified signal from a respective one of the low noise amplifiers 18 which are electrically coupled with the respective receiving antenna 16. As shown, each of the direct conversion receivers 20 splits the respectively received RF/MW signal 12 into first and second separate portions, with the first or in-phase ("I") portion being an output of a first (downconversion) mixer 22 while a second or quadrature ("Q") portion of the received RF/MW signal 12 being an output of the second (downconversion) mixer 24. A respective input local oscillator or frequency reference 26 couples the respective first (downconversion) mixer 22 and the second (downconversion) mixer 24 with one another to allow modification of the frequency or phase shifting, for example, of the respective received RF/MW signal 12 after the signal is split into its I and Q portions.

Thereafter, both the I portion and the Q portion of the respective received RF/MW signal 12 are then sent or inputted into the Analog Signal Processing device, e.g., an IQ mux 28, where the I portion and/or the Q portion of each of the received RF/MW signals 12 can then be modified, as necessary or required the operator, depending upon the particular application, before both of those modified signals are then outputted from the Analog Signal Processing device or IQ mux 28, as discussed above, are recombination with one another and transmission to the desired destination(s), recipient(s) or end user(s).

As with the previous embodiments, the two suitably modified output signals, from the Analog Signal Processing device or IQ mux 28, are then respectively sent to a respective direct conversion transmitter 29 (shown in dashed lines) which comprises a respective third (upconversion) mixer 30 and a respective fourth (upconversion) mixer 32 and well as a respective common connection node (not separately labeled) for combining the respective (modified) I portion and the (modified) Q portion with one another. A respective output local oscillator or frequency reference 34 electrically couples or interconnects both of the respective third (upconversion) mixer 30 and the respective fourth (upconversion) mixer 32 with one another to allow any desired modification of the frequency and/or the phase of the signal, for example, the I portion and the Q portion of the respective modified RF/MW signal 14. As noted above, the output sides of each of the respective third (upconversion) mixer 30 and the respective fourth (upconversion) mixer 32 are then combined with one another at the respective common node. Thereafter, the combined signal then passes through a respective output amplifier 36 and is then sent to a respective output antenna 38 for transmission of the respective modified RF/MW signal 14 to the desired destination(s), recipient(s) or end user(s).

As with the third embodiment, the I portion, outputted from the first (downconversion) mixer 22, is also sent to a respective I portion first ADC 42 (e.g., an analog digital converter) where the I portion analog signal is converted, in a conventional manner, into a digital signal to facilitate processing of that digital signal by the DSP and Control unit 40 while the respective Q portion, outputted from the respective second (downconversion) mixer 24, is sent to a respective Q portion second ADC 42' (e.g., an analog digital converter) where the Q portion analog signal is converted, in a conventional manner, into a digital signal for processing of that digital signal by the DSP and Control unit 40, in a conventional manner. The DSP and Control unit 40 may include, for example, a desired algorithm, to facilitate the desired manipulation of the digital signals, as required or instructed by the operator.

Also, as generally shown in FIG. 4, the DSP and Control unit 40 is also directly electrically coupled to each of the input local oscillators or frequency references 26 as well as each of the output local oscillators or frequency references 34 to facilitate controlling, by the operator of the DSP and Control unit 40, either the frequency and/or the phase of each of the received RF/MW signals 12 and/or the modified RF/MW signals 14, in a conventional manner. In addition, the DSP and Control unit 40 can transmit desire control signals to the Analog Signal Processing device or IQ mux 28 as well as receive MEAS from the Analog Signal Processing device or IQ mux 28.

As diagrammatically shown in FIG. 4, a first control signal, from the DSP and Control unit 40, can be sent to a respective first DAC 44, i.e., a digital to analog converter, for conversion into an analog control signal, in a conventional manner, which is then sent to be combined with the respective first signal outputted from the Analog Signal Processing device or IQ mux 28 and inputted to the respective third (upconversion) mixer 30, while a second control signal, from the DSP and Control unit 40, can be sent to a respective second DAC 44', i.e., a digital to analog converter, for conversion into an analog signal, in a conventional manner, which is then sent to be combined with the respective second signal outputted from the Analog Signal Processing device or IQ mux 28 and inputted to the respective fourth (upconversion) mixer 32.

It is to be appreciated, however, that the DSP and Control unit 40 also introduces additional latency into the system. The amount of latency introduced depends upon the particular components, wires and circuitry which comprise part of the first and second ADCs 42, 42', the first and second DACs 44, 44' and the DSP and Control unit 40.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Wherefore, we claim:

1. An analog transceiver having low latency for processing a received RF/MW signal and modifying the received RF/MW signal into a modified RF/MW signal prior to transmission of the modified RF/MW signal, the analog transceiver comprising:
 a receiving antenna for receiving the RF/MW signal;
 a direct conversion receiver, coupled with the receiving antenna, for splitting the received RF/MW signal into an in-phase portion and a quadrature portion;
 an analog signal processing device, coupled with the direct conversion receiver, having a plurality of actuatable switches for modifying, as desired, the in-phase portion and the quadrature portion and outputting a suitably modified in-phase portion and a suitably modified quadrature portion from the analog signal processing device while only introducing minimal latency during processing;
 a direct conversion transmitter, coupled with the analog signal processing device, for receiving the suitably modified in-phase portion and the suitably modified quadrature portion and forming the modified RF/MW signal therefrom; and
 a transmitting antenna being coupled with direct conversion transmitter for receiving the modified RF/MW signal and transmitting the modified RF/MW signal.

2. The analog transceiver according to claim 1, wherein a low noise amplifier is electrically coupled with the receiving antenna for receiving and amplifying the received RF/MW signal.

3. The analog transceiver according to claim 2, wherein the direct conversion receiver is connected to the low noise amplifier.

4. The analog transceiver according to claim 1, wherein, within the direct conversion receiver, the in-phase portion is outputted from a first mixer while the quadrature portion is outputted from a second mixer.

5. The analog transceiver according to claim 4, wherein an input local oscillator electrically couples both the first mixer and the second mixer with one another for allowing modification of a frequency or phase shifting of the portions after the signal is split into its both the in-phase and quadrature portions.

6. The analog transceiver according to claim 1, wherein first and second suitably modified output signals are outputted from the analog signal processing device and sent to the direct conversion transmitter, and the direct conversion transmitter comprises a third mixer and a fourth mixer and well as a common connection node where the first and second suitably modified output signals are combined with one another.

7. The analog transceiver according to claim 6, wherein, within the direct conversion transmitter, an output local oscillator is electrically coupled to both the third mixer and the fourth mixer for allowing modification of a frequency or phase shifting of the first and the second suitably modified output signals.

8. The analog transceiver according to claim 1, wherein an output amplifier, for amplifying the modified RF/MW signal, electrically couples the direct conversion transmitter with the output antenna for transmission of the modified RF/MW signal.

9. The analog transceiver according to claim 1, wherein in-phase portion and a quadrature portion are each split into a differential signal, the analog signal processing device comprises a plurality of switches, and selective actuation of two of the plurality of switches allows one of:
the in-phase portion and/or the quadrature portion to pass through the analog signal processing device without any modification thereof,
switching of the in-phase portion and/or the quadrature portion with one another,
inversion of the in-phase portion and/or the quadrature portion, or
both switching and inversion of the in-phase portion and/or the quadrature portion of the signals.

10. The analog transceiver according to claim 1, wherein the analog transceiver is equipped with a digital controller, the in-phase portion and the quadrature portion, outputted from the first mixer and the second mixer are coupled to an analog digital converter which is connected with the DSP and control unit for converting the analog signal into a digital signal to facilitate processing of that digital signal by the DSP and control unit, the DSP and control unit facilitates manipulation of the digital signal, as desired or required by an operator, prior to a signal being outputted from the DSP and Control unit to the analog signal processing device to assist with processing of the analog signal passing through the analog signal processing device.

11. The analog transceiver according to claim 10, wherein within the direct conversion receiver, the in-phase portion is sent to a third mixer while the quadrature portion is sent to a fourth mixer, an input local oscillator is electrically coupled to both the third mixer and the fourth mixer to allow modification of a frequency or phase shifting of the signals, and the DSP and control unit is electrically coupled to both the input local oscillator and the output oscillator to facilitate modification of a frequency or phase shifting of the signals.

12. The analog transceiver according to claim 11, wherein the first mixer is electrically coupled with first analog digital converter where the in-phase portion analog signal is converted into a first digital signal for processing of the first digital signal by the DSP and control unit and the second mixer is electrically coupled a second analog digital converter where the quadrature portion analog signal is converted into a second digital signal to facilitate processing of the second digital signal by the DSP and control unit.

13. The analog transceiver according to claim 11, wherein the DSP and control unit is electrically coupled to a first digital to analog converter for conversion of a first output control signal into a first analog signal, which is then combined with a first signal outputted from the analog signal processing device and inputted to a third mixer, while the DSP and control unit is also electrically coupled to a second digital to analog converter for conversion of a second output control signal into a second analog signal, which is then combined with a second signal outputted from the analog signal processing device and inputted to a fourth mixer.

14. The analog transceiver according to claim 13, wherein an output signal from the third mixer is combined with an output signal from the fourth mixer at a common node to form the modified RF/MW signal for transmission by the transmitting antenna.

15. The analog transceiver according to claim 10, wherein the DSP and control unit is electrically coupled for transmitting desire control signals to the analog signal processing device and receiving measurements ("MEAS") from the analog signal processing device.

16. The analog transceiver according to claim 1, wherein the analog transceiver is capable of processing a plurality of separate and distinct received RF/MW signals and, thereafter, transmitting each of the modified RF/MW signals to a desired recipient.

17. A method or minimizing latency in an analog transceiver processing a received RF/MW signal and modifying the received RF/MW signal into a modified RF/MW signal prior to transmission of the modified RF/MW signal, the method transceiver comprising:
receiving the RF/MW signal via a receiving antenna;
splitting the received RF/MW signal into an in-phase portion and a quadrature portion via a direct conversion receiver which is coupled with the receiving antenna;
modifying, as desired, the in-phase portion and the quadrature portion and outputting a suitably modified in-phase portion and a suitably modified quadrature portion from the analog signal processing device while only introducing minimal latency during processing an analog signal processing device, coupled with the direct conversion receiver, via actuation of a plurality of actuatable switches;
receiving the suitably modified in-phase portion and the suitably modified quadrature portion, via a direct conversion transmitter which is coupled with the analog signal processing device, and forming the modified RF/MW signal therefrom; and
receiving the modified RF/MW signal, via a transmitting antenna coupled with direct conversion transmitter, and transmitting the modified RF/MW signal.

* * * * *